Aug. 6, 1929.          A. Y. DODGE          1,723,646
                  BRAKE OPERATING CONNECTION
                     Filed Oct. 24, 1925
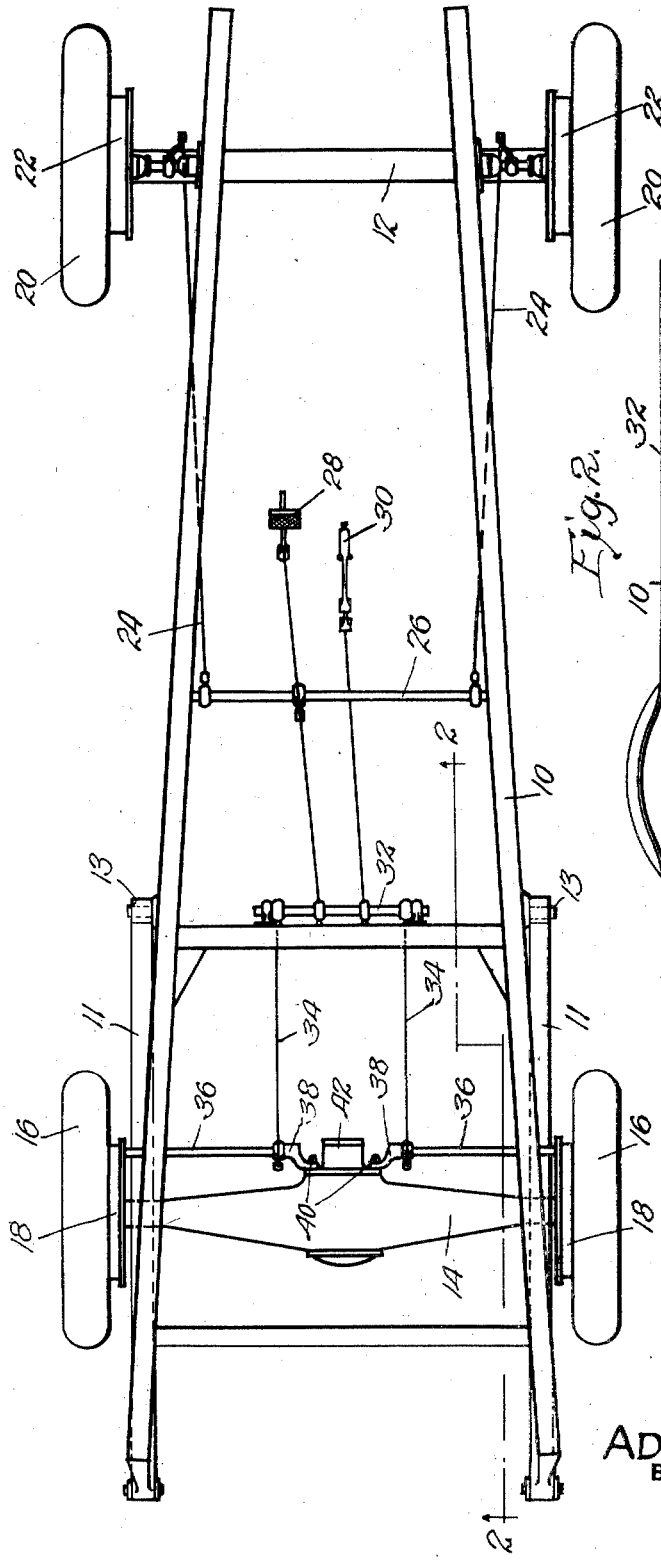
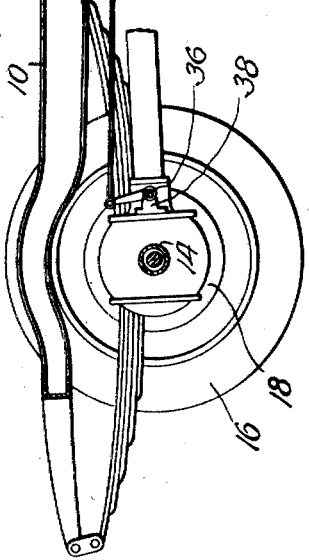
INVENTOR
ADIEL Y. DODGE
BY
ATTORNEY Patented Aug. 6, 1929.

1,723,646

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKE-OPERATING CONNECTION.

Application filed October 24, 1925. Serial No. 64,537.

This invention relates to brakes, and is illustrated as embodied in an automobile chassis having brakes on its wheels. An object of the invention is to provide a simple assembly, and to eliminate a number of parts, by supporting the inner ends of two brake-operating rockshafts on the removable cap closing the front of the rear axle housing, and ordinarily forming part of the differential carrier. This permits the support of the ends of the shafts, for example, by brackets secured to the cap by the same fastenings that hold the cap to the housing, thus eliminating a number of extra supporting and fastening parts.

These and other objects and features of the invention will be apparent from the following description of one illustrative embodiment shown in the accompanying drawing, in which:

Fig. 1 is a diagrammatic top plan view of the chassis.

Fig. 2 is a fragmentary side elevation partly in section of the rear end of the chassis.

The illustrated chassis includes a frame 10 supported by the usual springs on a front axle 12 and by springs 11 upon a rear axle including a banjo housing 14 supported by drive wheels 16 having brakes 18. The front wheels 20 have brakes 22 operated by connections 24 from a shaft 26 rocked by the pedal 28. Either pedal 28 or an emergency lever 30 can be operated to rock a second shaft 32 having at its ends two connections 34 attached to a pair of rockshafts 36, each operating one of the brakes 18.

Each rockshaft 36 is supported at its outer end by its brake 18, and at its inner end is journalled in a bracket 38 secured by bolts or other fastenings 40, which fastenings also serve to secure to the front of the axle housing 14 the removable cap 42 which forms a carrier for the differential (not shown) through which wheels 16 are driven.

Shafts 36 move with the rear axle, when the springs 11 flex, while shaft 32 is carried by the frame 10 at the pivoted front ends 13 of the springs, so that the spring movement has no effect on the brakes.

While one illustrative embodiment has been described in detail, it is not my intention to limit the scope of the invention to that particular embodiment, or otherwise than by the terms of the appended claim.

I claim:

A vehicle having, in combination, a rear axle housing provided with a removable front cap, wheels supporting the ends of the housing provided with brakes, a frame supported upon the housing by springs arranged on opposite sides of the frame and pivotally connected at their front ends therewith, a brake-applying rock shaft journaled for rotation upon the frame between and substantially in line with the pivotal connections of the front ends of the springs with the frame, a pair of brackets one secured to each side of the cap by a fastening attaching the bracket to the cap and the cap to the housing, a pair of brake operating rock shafts one for each brake, each rock shaft supported at its outer end by the brake and at its inner end by the corresponding bracket, and a brake applying connection between the inner end of each brake operating rock shaft and the outer end of the first mentioned rock shaft carried by the frame.

In testimony whereof, I have hereunto signed my name.

ADIEL Y. DODGE.